United States Patent [19]

Smalley et al.

[11] Patent Number: 5,178,258

[45] Date of Patent: * Jan. 12, 1993

[54] INERTIAL CONVEYOR SYSTEM

[76] Inventors: Alfred E. Smalley, Tunbridge La., Knoxville, Tenn. 37922; Joseph C. Gundlach, 142 Orchard La., Oak Ridge, Tenn. 37830

[*] Notice: The portion of the term of this patent subsequent to Sep. 10, 2008 has been disclaimed.

[21] Appl. No.: 648,530

[22] Filed: Jan. 30, 1991

Related U.S. Application Data

[63] Continuation-in-part of Ser. No. 470,844, Jan. 25, 1990, Pat. No. 5,046,602.

[51] Int. Cl.$^5$ .............................................. B65G 27/00
[52] U.S. Cl. ..................................... 198/750; 198/766
[58] Field of Search ................ 198/750, 752, 753, 766

[56] References Cited

U.S. PATENT DOCUMENTS

| | | | |
|---|---|---|---|
| 218,757 | 8/1879 | Martin, Jr. | 198/750 |
| 1,843,282 | 2/1932 | Horn et al. | 198/750 |
| 3,080,961 | 3/1963 | Allen et al. | 198/753 |
| 3,212,630 | 10/1965 | Allen et al. | 198/750 |
| 3,367,197 | 2/1968 | Tabor et al. | 198/750 X |
| 3,476,234 | 11/1969 | Allen et al. | 198/766 X |
| 3,817,370 | 6/1974 | Cox | 198/766 X |
| 3,910,422 | 10/1975 | Zierpka | 198/750 X |
| 4,019,626 | 4/1977 | Kammer | 198/750 |
| 4,339,029 | 7/1982 | Wilson | 198/750 |
| 4,436,199 | 3/1984 | Baba et al. | 198/750 |
| 4,567,979 | 2/1986 | Hoehn | 198/750 |
| 5,046,602 | 9/1991 | Smalley et al. | 198/750 |

Primary Examiner—Robert P. Olszewski
Assistant Examiner—James R. Bidwell
Attorney, Agent, or Firm—Pitts and Brittian

[57] ABSTRACT

An inertial-type conveyor system for the moving of articles from one position to another, the system having minimal detrimental vibrations. During a forward stroke of a tray of the system, the tray moves at a first acceleration whereby the frictional contact between the articles and the tray moves the articles in the same direction as the tray. Then during a return stroke, of an equal distance, the tray moves at a second acceleration generally greater than the first acceleration such that the articles continue to move by inertia on the tray while the tray is moving backward. In the preferred embodiment, the system is provided with a counterweight system having a counterweight element that moves in an opposite direction to the direction of motion of the tray to offset the reaction force produced by the moving tray. Elimination of undesirable vibrations is achieved through the use of the counterweight system and by having the tray system and the counterweight system to be substantially the same mass and have centers of mass that move along substantially the same line of action. In the preferred embodiment, the simultaneous movement of the tray system and counterweight system is achieved by cam followers in contact with cam surfaces of selected contours on a single rotatable cam member.

19 Claims, 5 Drawing Sheets

INERTIAL CONVEYOR SYSTEM

This is a continuation-in-part application based upon parent application Ser. No. 07/470,844, filed Jan. 25, 1990, U.S. Pat. No. 5,046,602.

FIELD OF INVENTION

This invention relates generally to systems for the transport of articles via a conveyor, and more particularly to a transport conveyor system utilizing the inertia of the articles themselves for movement along the conveyor to a destination point, the conveyor system having provision for minimizing vibration.

BACKGROUND ART

Conveyors systems are utilized in many industries, typically including the manufacturing and packaging industries. These conveyor systems can be of many types, such as continuous belt conveyors, shaker (inertial) conveyors, etc. Often the articles being transported must be deposited upon further conveyor units as in the case of a change in direction of the transfer. In the case of the continuous belt type conveyor, when articles are to be deposited upon another belt there is often a drop of several inches due to the size of the rollers/wheels that carry the belt. For some types of articles that are fragile, such as foodstuffs, this drop is detrimental. In the case of the shaker- or inertial-type conveyors, very little drop distance can be provided such that there is no damage to the articles being transferred. Also, the tray in this latter type of conveyor can be made of materials that will not be damaged by the material being transferred and, more importantly, will not contaminate the materials being transferred.

A problem that has been encountered in the prior art is the matter of the vibration that often occurs with the devices for inertial-type conveyors. The principle of these conveyors is to cause vibration of the transfer tray such that during a "forward" stroke, the articles are moved with the tray. Then, during the "return" stroke, the inertia of the articles causes them to remain in motion slipping along the tray as the tray is returned. To accomplish this, the tray oscillation is produced by a wide number of mechanisms. Some of these create substantial vibration such that the machine must be firmly attached to a support surface.

A number of mechanisms have been devised to produce the tray oscillation and, in some of the designs, to minimize the vibration. Typically of these prior art devices are those shown and described in U.S. Pat. Nos. 218,757 issued to F. Martin, Jr. on Aug. 19, 1879; 1,843,282 issued to E. Horn et al on Feb. 2, 1932; 3,212,630 issued to K. M. Allen et al on Oct. 19, 1965; 4,019,626 issued to H. J. Kamner on Apr. 26, 1977; and 4,339,029 issued to D. A. Wilson On Jul 13, 1982.

Still other references that may be material relative to the present invention are U.S. Pat. Nos.: 3,476,234 issued to K. L, M. Allen, et al on Nov. 4, 1969; 3,817,370 issued to J. P. Cox on Jun. 18, 1974; 4,436,199 issued to K. Baba, et al on Mar. 13, 1984; and 4,567,979 issued to R. A. Hoehn on Feb. 4, 1986. In particular, the '234 Allen reference uses two conveyor members that are driven longitudinally by a single drive means, with one conveyor member used to counter the vibration of the other. As each conveyor moves in a first direction, it is moved downwardly; then, as it is moved in the opposite direction, it is moved upwardly to advance any material supported thereon. The structure provides a generally back-and-forth vibratory motion, with a tossing motion being given to the conveyors and thus to the material. Both conveyor members have the same acceleration in each direction of motion as they are driven by a common crankshaft-eccentric mechanism.

All of these known systems must be designed for the transport of a specific article on the conveyor, with the exception of those described in the '626 and '019 patents which can be modified for specific products. However, even with the effort to minimize vibration, each of these devices does produce undesirable vibration (and thus noise) during operation. Further, some of these systems (e.g., the '234 reference) will damage fragile items being transported on the tray thereof. While these patents describe the principles of inertial conveyance, several are constructed without an understanding of these principles.

Accordingly, it is an object of the present invention to provide an inertial-type convey system that substantially eliminates vibration effects of the operating mechanism.

Another object of the present invention is to provide means for offsetting a reaction force produced by the acceleration of the conveyor tray and for offsetting a couple produced by that reaction force to thereby eliminate vibrational effects.

It is another object of the present invention to provide an inertial conveyor system utilizing a counterbalance (counterweight) means to offset the reaction force produced by the moving of the conveyor tray means so as to substantially eliminate vibration effects of the operating mechanism.

It is also an object of the present invention to provide a conveyor system using a counterweight means to overcome vibration where the weight of the counterweight means is substantially equal to the weight of the conveyor tray means and wherein the center of mass of the counterweight means is matched to the center of mass of the conveyor tray means along a common line of action in order so as to provide for offsetting the reaction force and the couple produced by the acceleration of the conveyor tray means.

These and other objects of the present invention will become apparent upon a consideration of the drawings which are referenced below and a complete description thereof.

SUMMARY OF INVENTION

In accordance with the present invention, there is provided in the preferred embodiment an inertial conveyor system wherein a plurality of rotatable cam surfaces and cam followers provide simultaneous reciprocating longitudinal movement of a conveyor tray means and a counterweight means, with the counterweight means moving in a direction opposite the movement of the conveyor tray means. The conveyor tray means and the counterweight means are constructed such that the reaction force of the conveyor tray means equals the reaction force of the counterweight means, and the couple (rotational force) of the conveyor tray means equals the couple of the counterweiqht means (where reaction force is mass times acceleration and couple is the reaction force times distance from a common reference point). These equalities are satisfied, in one embodiment, when the conveyor tray means and the counterweight means have substantially the same weight and when the center of mass of the conveyor tray means and that of the counterweight means move along a common line of action. By this construction, the various forces are limited to the oscillatory movement without attendant undesirable vibrations. In an embodiment to efficiently move articles, the cam surfaces are contoured so as to provide a forward stroke for about 226° and a return stroke for about 134°. The system can be utilized to move articles in either of the two possible directions.

DETAILED DESCRIPTION OF THE INVENTION

Figure 1:
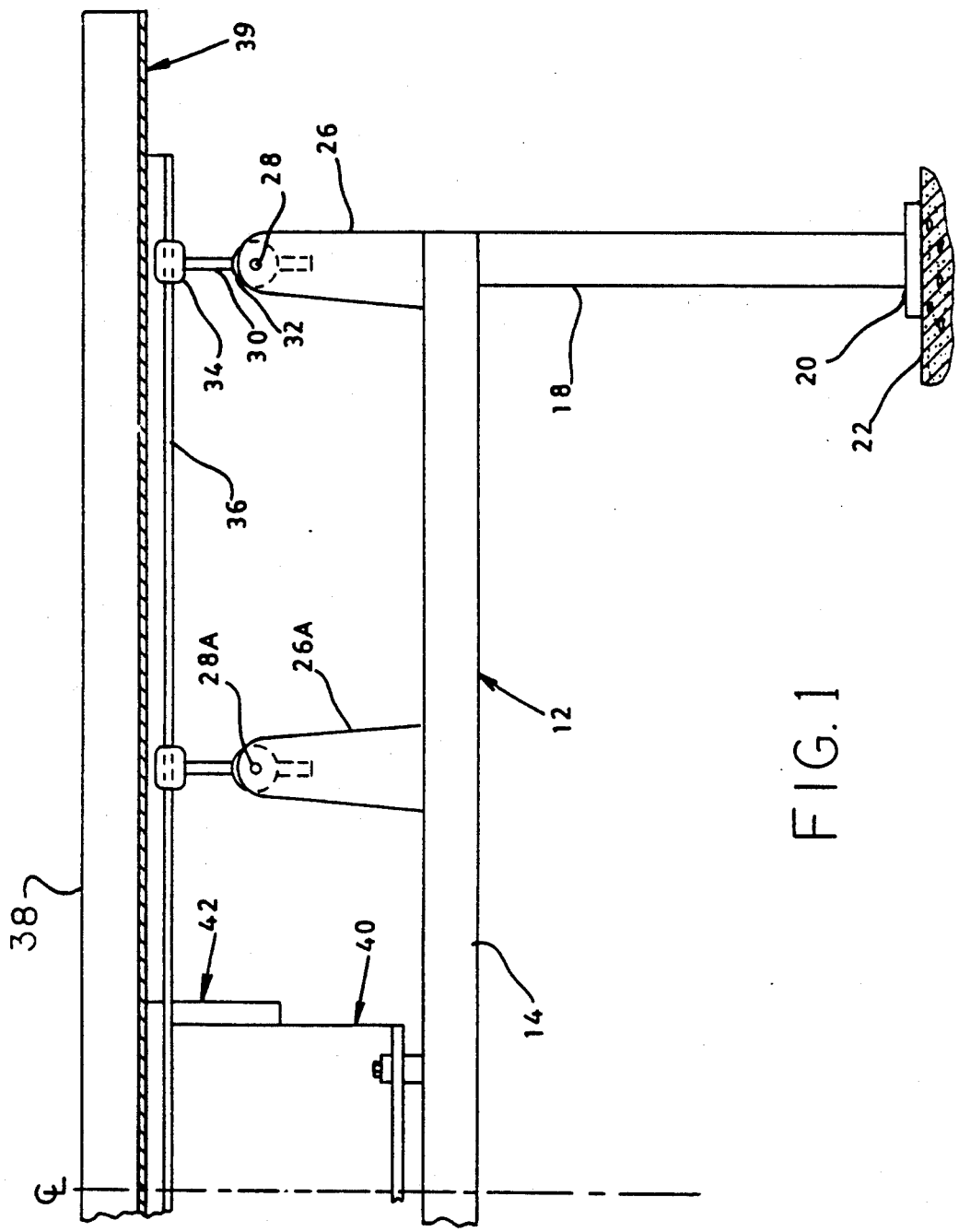
FIG. 1 is a side elevation of a general conveyor system that incorporates the features of the present invention, this drawing illustrating approximately one-half of the system.
Figure 2:
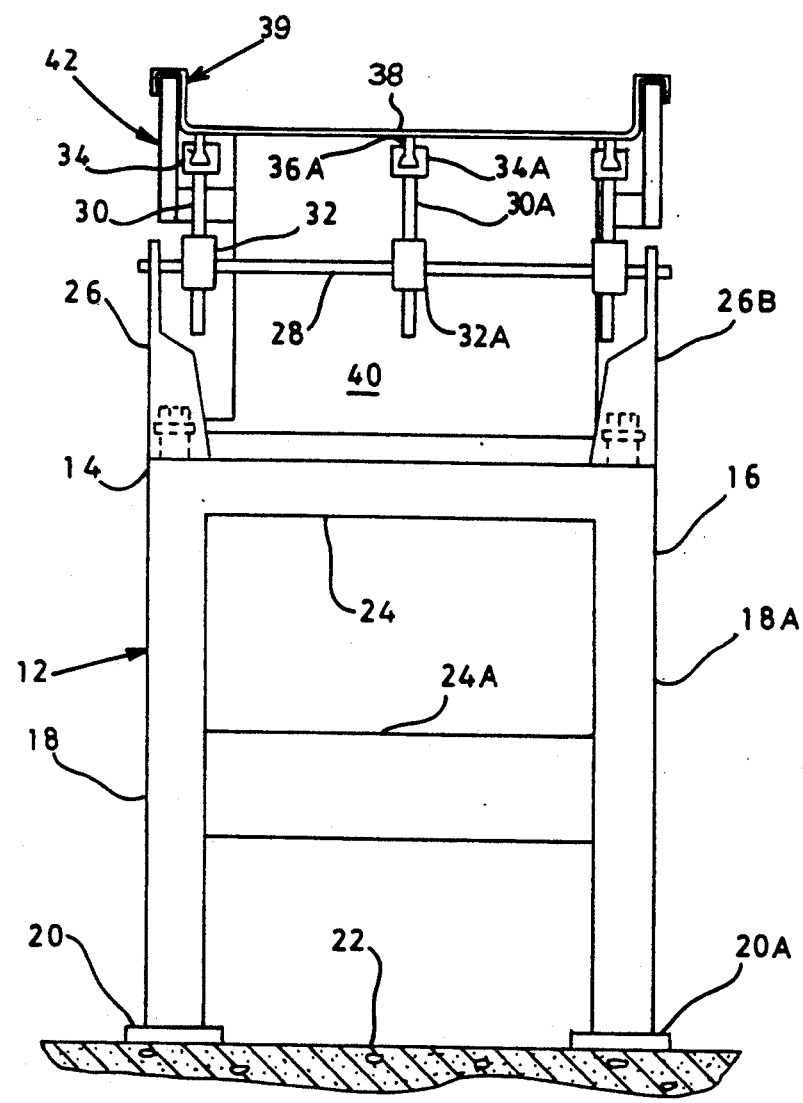
FIG. 2 is an end elevation of the general conveyor system of FIG. 1.

Referring first to FIGS. 1 and 2, shown therein is the general form of the inertial conveyor system of the present invention. It has a frame 12 which typically has a pair of side supports 14, 16 extending substantially the length of the device, with a plurality of upright legs 18, 18A, etc. that terminate in plate-like feet 20, 20A, etc. to provide adequate support upon a surface 22. If desired, these feet can be attached to the support surface. Appropriate cross-braces 24, 24A, etc. are typically used. It will be understood, however, that the shape and overall construction of the frame 12 can be changed without departing from the scope of the present invention.

A plurality of upright supports 26, 26A, etc. are fixedly attached to the top edge of the side supports 14, 16. These upright supports typically support bars 28, 28A, etc. passing across the frame 12, with upright leveling arms 30, 30A, etc. adjustably mounted from the support bars using coupling means 32, 32A, etc. Guide members 34, 34A, etc. are typically attached to the upper ends of these leveling arms, with these guide members engaging slideways 36, 36A, etc. attached to (or forming part of) the bottom of a conveyor pan or tray 38 as part of a conveyor tray means 39. Also attached to the top edge of the side supports 14, 16 is a mechanism 40 for the operating components utilized to create the reciprocating motion of the conveyor tray means 39, as well as the reciprocating motion of a counterweight means 42. As is the case of the components of the frame 12, the other general tray support components discussed are not considered unique relative to the present invention except for the details given hereinafter with regard to the content of the enclosure 40 and the counterweight means 42.

Figure 3:
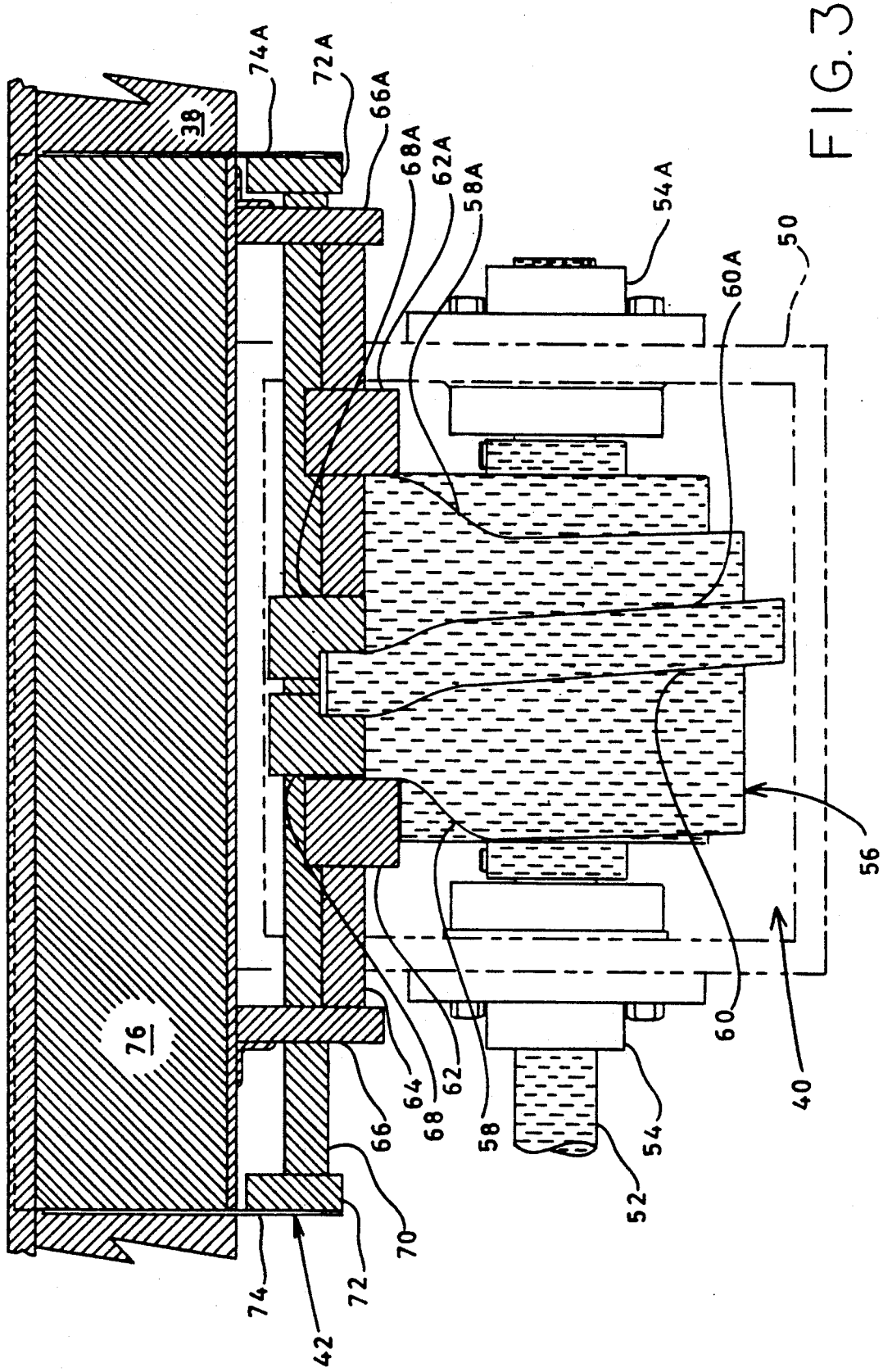
FIG. 3 is a side elevation of the drive mechanism as utilized in the general conveyor system of FIG. 1 to substantially eliminate vibration, and showing the relationship of this drive mechanism to the tray of the conveyor system. In this FIG. 3 (and in FIG. 4) surfaces are shaded using color symbols to distinguish between the components that produce movement of the conveyor tray, the components that move the counterweight, and the components that relate to both movements.
Figure 4:
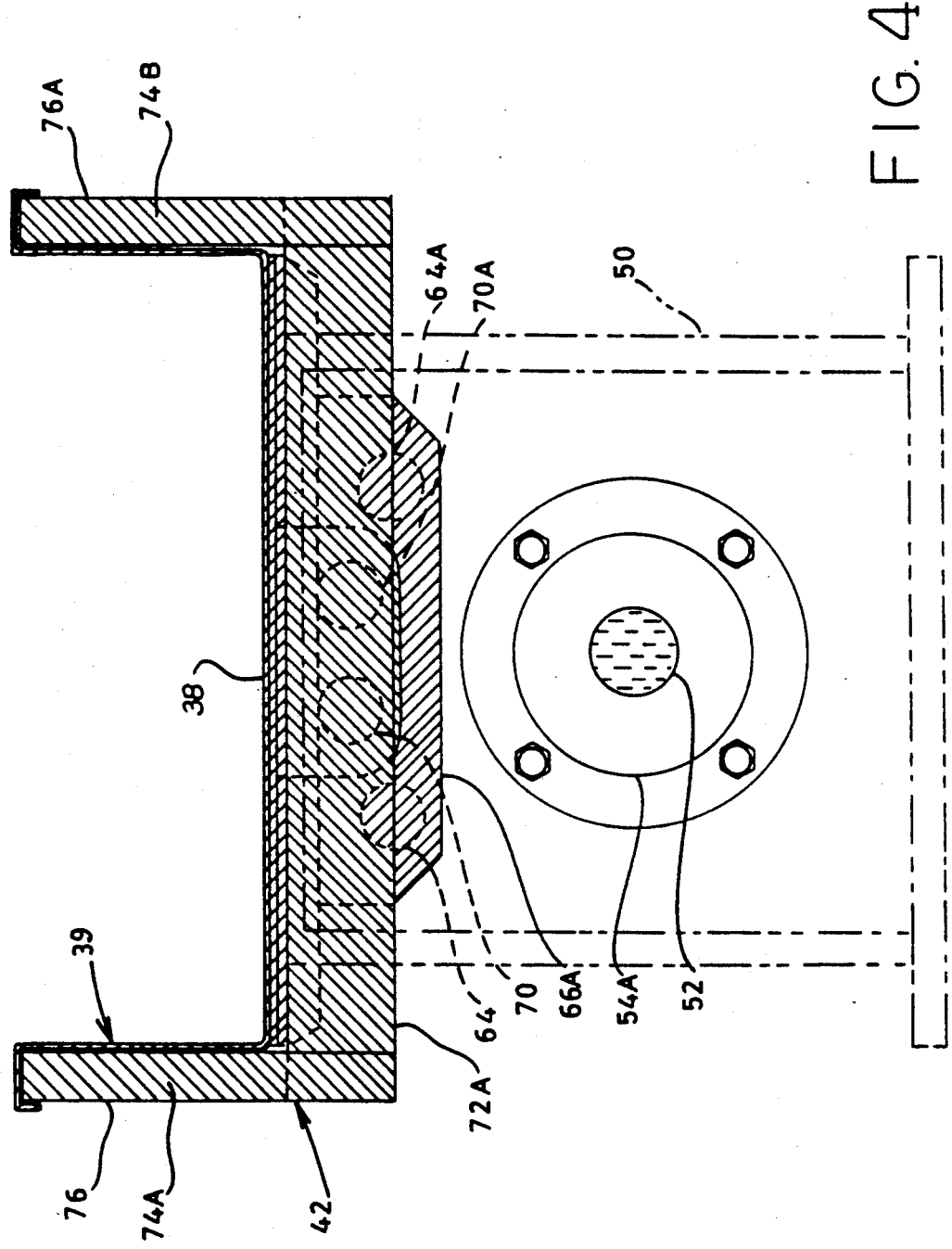
FIG. 4 is an end elevation of the apparatus shown in FIG. 3.

Referring now to FIGS. 3 and 4, shown therein are the components used in accordance to the present invention to achieve oscillatory axial movement of a conveyor tray means 39, including pan 38, and counterweight means 42, the counterweight means being a preferred form of means to offset a reaction force produced by the means 39 moving tray 38. In order to distinguish the various components as related to the movement of the tray means and counterweight means, component shading is used in these figures. Components (i.e., the tray means) associated with only tray movement are shaded with closely spaced diagonal lines, components associated with only counterweight means movement are shaded as with closely spaced diagonal lines in an opposite direction, and components associated with both movements are shaded with vertical dashed lines.

This mechanism 40 is housed in an enclosure 50, primarily so that adequate lubrication can be provided. A shaft 52, driven by any suitable rotating means, traverses this enclosure where it is journalled in bearing-/seal units 54, 54A. A cam member 56 is attached to this shaft within the enclosure. This cam member 56 typically is fabricated from nylon or has a nylon outer surface. Of course, other suitable materials can be used. The cam member has cam surfaces 58, 58A at opposite ends, with these surfaces being uniformly spaced apart. In addition, a second pair of cam surfaces 60, 60A are provided on the periphery of the cam member, with these surfaces also being uniformly spaced apart. The particular contour of these cam surfaces 58, 58A, 60, 60A will be discussed in detail hereinafter.

In the particular embodiment illustrated in FIG. 3, the cam surfaces 58, 58A are utilized to drive the pan or tray 38 of the conveyor. Accordingly, cam followers 62, 62A are mounted on a reciprocatable member 64 (a second set of followers and reciprocatable member are also used, see FIG. 4) that passes through appropriately-bushed openings in the enclosure 50. These cam followers typically have rollers in contact with the surfaces of the cam member. Opposite ends of the reciprocatable member 64 are attached to pan supports 66, 66A that are fixedly attached to the tray 38 with any suitable means. The cam followers, the reciprocatable member(s) 64, the pan supports 66, 66A, and the pan or tray 38 make up the conveyor tray means 39. Thus, as the cam member 56 is rotated, cam followers 62, 62A move axially as they follow the contour of cam surfaces 58, 58A and, accordingly, move the member 64 axially to cause the tray to move longitudinally. As discussed below, the contours of the cam surfaces 58, 58A determine the distance of travel as well as the velocity and acceleration of the tray 38.

Cam followers 68, 68A (also typically with rollers) are attached to another reciprocatable member 70 (a second similar member is shown in FIG. 4), and these cam followers track the cam surfaces 60, 60A. Thus, as the cam member is rotated, the member 70 is caused to reciprocate. This member 70 passes through appropriately-bushed openings in both the enclosure 50 as well as the tray supports 66, 66A. Attached at opposite ends of the member 70 are support means for the counterweights. These support means include cross-brace members 72, 72A and upright members 74, 74A, etc. (see FIG. 4). Attached to these upright members is a counterweight 76. A second counterweight 76A is on the opposite side of the tray as shown in FIG. 4. Although not shown, the position of the counterweights 76, 76A can be adjusted relative to the upright members 72, 72A so as to adjust the center of mass of the counterweight means 42 relative to the center of mass of the conveyor tray means 39. In this manner, the center of mass of these two means can be made to move along a common line of action during operation of the conveyor system. As indicated above, this is one embodiment for matching the reaction force and the couple of the two portions of the present invention.

The cam followers 58, 68A, the member(s) 70, the counterweight supports 72, 72A, 74, 74A and the counterweights 76, 76A make up the counterweight means 42. By this construction, the counterweight means 42 is moved in the opposite direction from movement of the tray means 39 to offset the reaction force produced by means 39 in moving the tray 38. By the choice of the cam surfaces 60, 60A the counterweight means can be moved with the proper distance, acceleration and velocity to negate vibration that would be caused by the movement of the tray 38.

The weight of the two counterweights 76, 76A is chosen, in combination with their actuating means, to be approximate the weight of the moving tray 38 and its actuating means. Furthermore, the shape and position of the counterweights are chosen so that the center of mass of the counterweight means 42 moves along a line of action that is common with the movement of the center of mass of the tray means 39. This matching of the weights and centers of mass substantially negates undesirable vibration.

Figure 5:
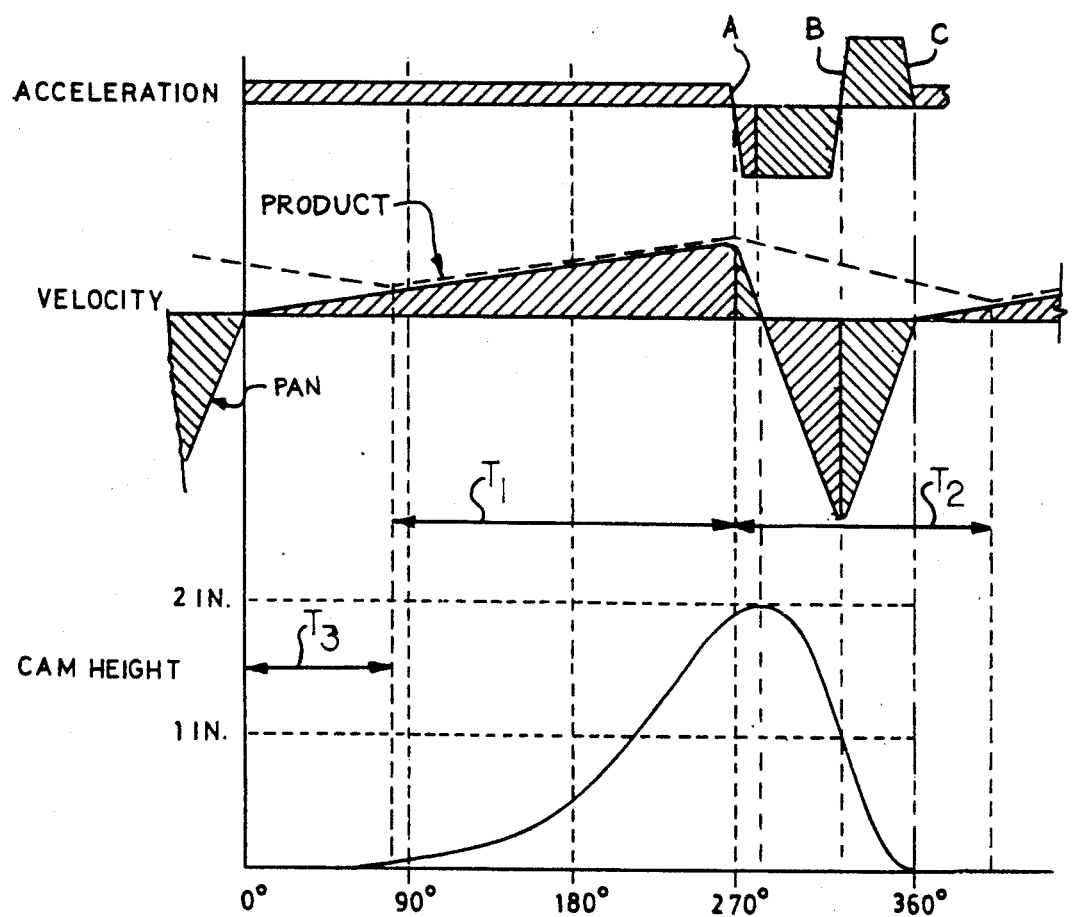
FIG. 5 is series of plots representing acceleration, velocity and cam height as a function of rotation of a cam utilized to produce the inertial motion to articles handled on the conveyor of the present invention.

A typical relationship between acceleration and velocity of a tray (for a given R.P.M.) is depicted in FIG. 5 as a function of the contour of the cam member during a complete rotation thereof. The values of velocity and acceleration (which is the derivative of velocity) of the tray or pan are shown as being cross-hatched with the indications where there is negative velocity and negative acceleration in addition to the positive values thereof. These values are those that would be experienced when a cam member is used having a two inch stroke and the forward stroke is about 270° with the return stroke being about 90°. As discussed hereinafter, other proportions of forward and return strokes can be used effectively. Of course, other stroke lengths can be used also. In order to understand the effect of the pan movement upon products carried thereon, the velocity of the product is indicated with a dashed line adjacent the velocity of the pan.

Portions of the velocity curves of the pan and the product articles for a previous and following rotation of the cam member are shown to assist in this understanding of product movement by inertia. In this embodiment, the cam member initially (in a given revolution of the cam member) provides a constantly increasing velocity that results in a constant acceleration. The acceleration achieved during at least a major portion of the forward stroke is chosen such that the frictional contact (due to the coefficient of friction of the product and of the pan) between product articles on the tray and the surface of the tray causes the product articles to move in the same direction as the tray with the same velocity. The acceleration during this forward stroke can be limited (by cam shape and R.P.M.) to that at which frictional contact of the product articles and the tray is not overcome as discussed in the afore-referenced patent application Ser. No. 07/470,844. If necessary, this coefficient of friction can be determined by measuring the angle of repose which is the maximum angle at which the product will stay in place. Typical values are 31° for a coefficient of friction of 0.6 to 11+° for a coefficient of friction of 0.2.

As illustrated in FIG. 5, as the 270° of the cam member is approached, the velocity of the pan is rapidly decreased resulting in a rather sudden change in acceleration to a negative acceleration. A small transition of, for example, 2° on the cam member provides a small "slope" to the acceleration changes as indicated at A, B and C. This reduces "hammer-type" noise. The product articles, however, continue to move across the surface of the tray due to their inertia as the tray direction is reversed. The velocity of the product articles is gradually reduced during the return stroke of the pan due to frictional effect. This return stroke (in this embodiment) occurs over a period of about 90° of rotation. For about one-half of this return stroke, the nearly linear increase of velocity in the opposite direction produces the nearly constant (but negative) acceleration with this acceleration being sufficient to completely overcome frictional forces between the articles and the tray so that, as indicated, the product articles continue to move forward by inertia. As the velocity during the return stroke returns to a zero value before beginning the forward stroke, the acceleration again changes direction and is a rather constant but large value. When the cam member has completed one full revolution and is started on the next revolution the product articles are again accelerated when the pan velocity reaches a point where the pan and product articles move together.

In this FIG. 5 the general contour of a cam member is depicted for a two-inch stroke. In order to prevent a too severe angle of attack of cam followers on a cam having a two-inch stroke, the cam member typically has an 8-inch diameter. When only a one-inch stroke is required, this diameter can be smaller. It will be understood, however, that other stroke values can be used as well as other divisions of forward and reverse directions during each revolution of the cam member. Generally, the forward stroke is about 200° to about 280° of a revolution with the return stroke being essentially all of the remaining portion of a revolution of the cam member. Also, the cam surfaces can be altered to provide substantially constant velocity during the forward stroke as long as the resultant ever-increasing acceleration on the forward stroke moves the articles in the same direction as the tray, with the acceleration on the return stroke being greater than this value of the forward stroke.

Since there is a portion of the rotation of the cam member in the forward stroke where the velocity of the product articles is reducing, there is some inefficiency in the transport of the product. It can be seen that during a time $T_1$ the articles are being carried forward on the pan. Then during a time $T_2$ the product articles are being carried forward by their own inertia. The lost time $T_3$, with this particular proportion of forward and return strokes, is nearly 90° of rotation.

In order to reduce this lost time and thus more efficiently transfer product articles, it has been found that for most products a forward stroke during about 226° and a return stroke of about 134° substantially improves the throughput of the system. In addition, about a 2° transition between the change in acceleration is effective in reducing some of the noise generated by the system due to moving mechanical components. When product articles exhibiting higher than average coefficients of friction are being moved, any detrimental effect of the increased friction can be overcome by changing the rotational speed of the cam member.

It will be understood that the cam member can be rotated in an opposite direction. When opposite rotation is used articles supported on the conveyor tray can be moved in the opposite direction, i.e., the forward and reverse strokes are interchanged. This feature can be utilized to move articles first in one direction for a time duration until, for example, a bin at a receiving end of the conveyor is full. Articles can then be moved in the opposite direction to fill another bin, for example.

The forces on the return stroke of the tray of the conveyor are about 17 times the forces on the forward stroke. These forces are independent of the length of the stroke if the same cam attack angle is provided. Thus, with a typical 75 pound mass tray system and a two inch stroke at 300 RPM, about 277 ft.lb. of torque are required at the maximum torque point of the return stroke on a twelve inch diameter cam member. With a typical gear ratio of 6:1, a 1800 RPM motor would require a short interval surge of about 15.4 horsepower, five times each second. Substantial inertia should be designed into the rotating system so that the torque is averaged out, but a two to three horsepower motor requirement should be expected.

If the stroke is divided as 225° forward and 135° return (as determined by the cam surfaces), the forces on the return stroke are reduced to 4.5 times the forces on the forward stroke. This substantially reduces the horsepower requirement. However, the minimum operable RPM is then ½ the optimum operable RPM thus making the speed more critical for different values of coefficient of friction. In addition, the optimum RPM is 0.707 of that of the 270/90° stroke and the throughput per stroke is closer to 1.0 making the throughput per unit time only ½ of the 270/90° stroke.

A conveyor system embodying the principles of matching the reaction forces and couples of the conveyor tray means and the counterweight means has been constructed. To achieve this matching, the conveyor system has a counter weight means of substantially the same mass as the tray means, the two means having a common line of action for their individual centers of equal mass. This unit has demonstrated that substantially all detrimental vibration has been eliminated during the conveying of articles thereon.

From the foregoing, it will be understood by persons skilled in the art that an improved inertial-type conveyor system is provided. This conveyor system demonstrates reduced detrimental vibration as compared to other known conveyor systems. Although the device has been described as having some components (e.g., the cam member) that perform a dual function in the motion of the conveyor tray means and the counterweight means, it will be understood that each can separate cam members and drive means. Certain specific information is provided herein as to operating conditions; however, these conditions are given for illustration purposes and not for limitation of the present invention. Rather, the invention is to be limited only by the appended claims and their equivalents when considered with a complete disclosure of the invention.

We claim:

1. An inertial-type conveyor system for the moving of articles therewith, said conveyor system having reduced detrimental vibration, said conveyor system comprising:

a frame member;

a conveyor tray means, including a tray member, adapted for longitudinal movement relative to said frame member and mounted on said frame member, said tray member for support and movement of said articles, said conveyor tray means for moving said tray member in a forward longitudinal stroke of a first selected distance at a first acceleration for a first selected time period whereby said articles move in a forward direction with said tray member, and for moving said tray member in an opposite return longitudinal stroke of said first selected distance during a selected second time period at a second acceleration in an opposite direction greater than said first acceleration whereby said articles continue to move in said forward direction on said tray member by inertia while said tray member moves in said opposite direction;

counterweight means associated with said frame member for offsetting reaction force and rotational force produced by movement of said conveyor tray means during said forward and return strokes of said tray member, said counterweight means including a counterweight element, said counterweight means adapted for longitudinal movement during movement of said tray member in a second distance an in a direction opposite to said forward stroke of said tray member during said first selected time period, and in said second distance and in a direction opposite to said return stroke of said tray member during said second selected time period;

means for longitudinally moving said conveyor tray means and said counterweight means in opposite directions relative to said frame member; and wherein said conveyor tray means and said counterweight means have equal centers of mass that move along a common line of action during movement of said conveyor tray means and said counterweight means thereby offsetting said reaction force and rotational force of said conveyor tray means.

2. The conveyor system of claim 1 wherein said tray member has opposite side edges, and said counterweight element includes counterweights of substantially equal mass disposed adjacent each of said opposite side edges of said tray member.

3. The conveyor system of claim 1 wherein said means for moving said conveyor tray means in opposite directions comprises:

a rotatable cam member for said conveyor tray means, said cam member for said conveyor tray means provided with a cam surface of a selected configuration according to said first and second time periods and said first selected distance;

cam follower means in contact with said cam surface of said cam member for said conveyor tray means, said cam follower means attached to said tray member whereby movement of said cam follower means by said cam surface results in said forward and return strokes of said tray member; and drive means for continuously rotating said cam member for said conveyor tray means in a selected direction.

4. The conveyor system of claim 3 wherein said drive means is adapted for rotation in both directions whereby said forward and return strokes of said tray member are reversible.

5. The conveyor system of claim 1 wherein said means for longitudinally moving said counterweight means in opposite directions comprises:

a rotatable cam member for said counterweight means, said cam member for said counterweight means provided with a cam surface of a selected configuration according to said first and second time periods and said second distance;

cam follower means in contact with said cam surface of said cam member for said counterweight means, said cam follower means attached to said counterweight element whereby movement of said cam follower means by said cam surface results in said longitudinal movement of said counterweight means relative to said frame means; and drive means for continuously rotating said cam member for said counterweight means in a selected direction.

6. The conveyor system of claim 5 wherein said cam member for said counterweight means is a common cam member with said cam member for said conveyor tray means, said common cam member provided with said cam surface for moving said conveyor tray means and with said cam surface for moving said counterweight means, and wherein said drive means for continuously rotating said cam member for said counterweight means is said drive means for continuously rotating said cam member for said conveyor tray means.

7. The conveyor system of claim 3 wherein said forward stroke of said tray member has a time duration substantially longer than said return stroke.

8. The conveyor system of claim 7 wherein said forward stroke of said tray member occurs during about 220° to about 280° of rotation of said cam member for said conveyor tray means, with said return stroke occurring during the remainder of a revolution of said cam member for said conveyor tray means.

9. An inertial-type conveyor system for the moving of articles therewith, said conveyor system having reduced detrimental vibration, said conveyor system comprising:

a frame member;

a conveyor tray means, including a tray member and cam follower means attached to said tray member, adapted for longitudinal movement relative to said frame member and mounted on said frame member, said tray member for support and movement of said articles, said conveyor tray means for moving said tray member in a forward longitudinal stroke of a first selected distance at a first acceleration for a first selected time period whereby said articles move in a forward direction with said tray member, and for moving said tray member in an opposite return longitudinal stroke of said first selected distance during a selected second time period at a second acceleration in an opposite direction greater than said first acceleration whereby said articles continue to move in said forward direction on said tray member by inertia while said tray member moves in said opposite direction; and counterweight means associated with said frame member for offsetting reaction forces produced by movement of said tray member during said forward and return strokes, said counterweight means including a counterweight element and cam follower means attached to said counterweight element, said counterweight means adapted for longitudinal movement during movement of said tray member in a second distance and in a direction opposite to said forward stroke of said tray member during said first selected time period, and in said second distance and in a direction opposite to said return stroke of said tray member during said second selected time period;

means for longitudinally moving said conveyor tray means including a cam member having a first cam surface in contact with said cam follower means of said conveyor tray means and means for continuously rotating said cam member in a selected direction; and means for longitudinally moving said counterweight means in a direction opposite said moving of said conveyor tray means including said cam member having a second cam surface in contact with said cam follower means of said counterweight means;

said conveyor tray means and said counterweight means having equal centers of mass that move along a common line of action during movement of said conveyor tray means and said counterweight means whereby said conveyor system has reduced detrimental vibration.

10. The conveyor system of claim 9 wherein said means for rotating said cam member is adapted for rotation in both directions whereby said forward and return strokes of said tray member are reversible.

11. The conveyor system of claim 9 wherein said first cam surface on said cam member is a pair of equally spaced-apart first surfaces and said cam follower means of said conveyor tray means is a pair of cam followers, each of said cam followers in contact with one of said first surfaces, said pair of cam followers attached to said tray member with a reciprocatable member adapted to move in a direction parallel to said tray member.

12. The conveyor system of claim 9 wherein said second cam surface on said cam member is a pair of equally spaced-apart second surfaces and said cam follower means of said counterweight means is a second pair of cam followers, each of said cam followers being in contact with one of said second surfaces, said second pair of cam followers attached to said counterweight element with a second reciprocatable member adapted to move in a direction parallel to said tray member.

13. The conveyor system of claim 9 wherein said tray member has opposite side edges, and said counterweight element includes counterweights of substantially equal mass disposed adjacent each of said opposite side edges of said tray member, each of said counterweight adapted for position adjustment to achieve said center of mass that moves along a common line of action as said center of mass of said conveyor tray means.

14. The conveyor system of claim 9 wherein said forward stroke of said tray member occurs during about 220° to about 280° of rotation of said cam member, with said return stroke occurring during a remainder of a revolution of said cam member.

15. An inertial-type conveyor system for the moving of articles therewith, said conveyor system having reduced detrimental vibration, said conveyor system comprising:

a frame member;

a conveyor tray means, including a tray member and a first pair of cam follower means attached to said tray member, adapted for longitudinal movement relative to said frame member and mounted on said frame member, said tray member for support and movement of said articles, said conveyor tray means for moving said tray member in a forward longitudinal stroke of a first selected distance at a first acceleration for a first selected time period whereby said articles move in a forward direction with said tray member, and for moving said tray member in an opposite return longitudinal stroke of said first selected distance during a selected second time period at a second acceleration in an opposite direction greater than said first acceleration whereby said articles continue to move in said forward direction on said tray member by inertia while said tray member moves in said opposite direction; and counterweight means associated with said frame member for offsetting reaction forces produced by movement of said tray member during said forward and return strokes, said counterweight means including a counterweight element and a second pair of cam follower means attached to said counterweight element, said counterweight means adapted for longitudinal movement during movement of said tray member in a second distance and in a direction opposite to said forward stroke of said tray member during said first selected time period, and in said second distance and in a direction opposite to said return stroke of said tray member during said second selected time period;

a cam member having a first pair of equally spaced-apart cam surface in contact with said first pair of cam follower means of said conveyor tray means and second pair of equally spaced-apart cam surfaces in contact with said second pair of cam followers of said counterweight means; and means for continuously rotating said cam member in a selected direction to move said first and second pairs of cam followers and thereby longitudinally move said conveyor tray means and said counterweight means in opposite directions;

said conveyor tray means and said counterweight means having equal centers of mass that move along a common line of action during movement of said conveyor tray means and said counterweight means whereby said conveyor system has reduced detrimental vibration.

16. The conveyor system of claim 15 wherein said tray member has opposite side edges, and said counterweight element includes counterweights of substantially equal mass disposed adjacent each of said opposite side edges of said tray member.

17. The conveyor system of claim 15 wherein said forward stroke of said tray member occurs during about 220° to about 280° of rotation of said cam member, with said return stroke occurring during a remainder of a revolution of said cam member.

18. The conveyor system of claim 15 wherein said means for rotating said cam member is adapted for rotation in both directions whereby said forward and return strokes of said tray member are reversible.

19. The conveyor system of claim 15 wherein said forward stroke of said tray member occurs during about 225° of rotation of said cam member, and said return stroke occurs during about 135° of rotation.

* * * * *